(12) United States Patent
Ondruska et al.

(10) Patent No.: US 11,538,182 B2
(45) Date of Patent: *Dec. 27, 2022

(54) URBAN ENVIRONMENT LABELLING

(71) Applicant: BLUE VISION LABS UK LIMITED, London (GB)

(72) Inventors: Peter Ondruska, London (GB); Lukas Platinsky, London (GB); Giacomo Dabisias, London (GB)

(73) Assignee: Blue Vision Labs UK Limited, London (GB)

( * ) Notice: Subject to any disclaimer, the term of this patent is extended or adjusted under 35 U.S.C. 154(b) by 107 days.

This patent is subject to a terminal disclaimer.

(21) Appl. No.: 16/892,835

(22) Filed: Jun. 4, 2020

(65) Prior Publication Data

US 2020/0388047 A1    Dec. 10, 2020

Related U.S. Application Data

(63) Continuation of application No. 16/459,601, filed on Jul. 1, 2019, now Pat. No. 10,706,576, which is a
(Continued)

(30) Foreign Application Priority Data

Mar. 15, 2018  (GB) ...................................... 1804194
Aug. 10, 2018  (GB) ...................................... 1813101

(51) Int. Cl.
*G06K 9/00*  (2022.01)
*G06T 7/136*  (2017.01)
(Continued)

(52) U.S. Cl.
CPC ................ *G06T 7/70* (2017.01); *G06T 7/136* (2017.01); *G06T 2207/10004* (2013.01); *G06T 2207/20081* (2013.01); *G06T 2207/30244* (2013.01)

(58) Field of Classification Search
None
See application file for complete search history.

(56) References Cited

U.S. PATENT DOCUMENTS

2017/0186177 A1   6/2017  Soyeb et al.
2017/0263122 A1   9/2017  Kamajaya et al.
(Continued)

FOREIGN PATENT DOCUMENTS

EP    2526508       11/2012
JP    2002120676    4/2002
WO    2011091099 A1   7/2011

OTHER PUBLICATIONS

Cornelis, et al., "3D Urban Scene Modeling Integrating Recognition and Reconstruction," Int J Comput Vis (2008) 78: 121-141 (Year: 2008).*

(Continued)

*Primary Examiner* — Soo Shin
(74) *Attorney, Agent, or Firm* — Sheppard Mullin Richter & Hampton LLP

(57) ABSTRACT

The present invention relates to a method and system for automatic localisation of static objects in an urban environment. More particularly, the present invention relates to the use of noisy 2-Dimensional (2D) image data to identify and determine 3-Dimensional (3D) positions of objects in large scale urban or city environments. Aspects and/or embodiments seek to provide a method, system, and vehicle for automatically locating static 3D objects in urban environments by using a voting-based triangulation technique. Aspects and/or embodiments also provide a method for updating map data after automatically new 3D static objects in an environment.

20 Claims, 2 Drawing Sheets

Related U.S. Application Data continuation of application No. PCT/GB2019/050513, filed on Feb. 25, 2019.

(51) Int. Cl.
  *G06T 7/55* (2017.01)
  *G06T 7/70* (2017.01)
  *G06T 7/73* (2017.01)
  *G06V 20/10* (2022.01)
  *G06V 20/58* (2022.01)

(56) References Cited

U.S. PATENT DOCUMENTS

2018/0307925 A1* 10/2018 Wisniowski ......... G06V 10/454
2019/0228318 A1*  7/2019 Kwant ................. G06T 7/77

OTHER PUBLICATIONS

Behrendt et al., "A Deep Learning Approach to Traffic Lights: Detection, Tracking, and Classification," 2017 IEEE International Conference on Robotics and Automation (ICRA) Singapore, May 29-Jun. 3, 2017 (Year: 2017).*

Canadian Patent Application No. 3,083,430, Search Report dated Sep. 14, 2021, 7 pages.

Ben-Haim et al., "Triangulation based topology approach for 2D point sets registration", Survey Review, vol. 46, No. 338, 2014, pp. 355-365.

Dabisias et al., "VALUE: Large Scale Voting-based Automatic Labelling for Urban Environments", 2018 IEEE International Conference on Robotics and Automation (ICRA), May 21, 25, 2018, Brisbane, Australia, pp. 6033-6038.

Fairfield et al., "Traffic Light Mapping and Detection," In Proceedings of the IEEE International Conference on Robotics and Automation, pp. 5421-5426, Shanghai, China, May 2011 (Year: 2011).

Kim et al., "Lane-level Positioning on 3D Tracking Path of Traffic Signs", Proceedings of the 11th Joint Conference on Computer Vision, Imaging and Computer Graphics Theory and Applications, vol. 3, VISAPP, 2016, pp. 644-350.

Xu et al., "Traffic Sign Detection Based on Voting Scheme and Link Distribution Model", International Smart Cities Conference (ISC2), 2017, (6 pages).

* cited by examiner

| Robust Voting-Based Triangulation |||
|---|---|---|
| Input: | I | set of images |
| | Q | camera intrinsics |
| | P | SE(3) camera poses |
| | $d_{max}$ | maximum reprojection error |
| | $\alpha$ | minimum ratio of inliers |
| Output: | L | 3D positions of objects |

Detect objects in 2D images:
1. for $I_i \in \mathbf{I}$
2.     $Z_i \leftarrow detect(I_i)$
3. $\mathbf{Z} \leftarrow \cup_i Z_i$
4. $L \leftarrow \emptyset$
5. for $(z_a, z_b) \in \mathbf{Z}^2$ Compute 3D position of the object:

6.     $l_{ab} \leftarrow triangulate(\{z_a, z_b\})$

Compute inliers for computed 3D position:

7.     $S_{ab} \leftarrow \{z_k | \forall z_k \in \mathbf{Z} : \pi(l_{ij}, p_k, q_k) - z_k < d_{max}\}$ Find the hypothesis with most votes:

8.     $a, b \leftarrow \arg\max_{a,b} |S_{ab}|$
9.     if $|S_{ab}| \geq \alpha \cdot mean(|S|)$
10.         $L \leftarrow L \cup triangulate(S_{ab})$
11.         $\mathbf{Z} \leftarrow \mathbf{Z} - S_{ab}$
12.         goto 5
13. return L

Figure 2

URBAN ENVIRONMENT LABELLING

CROSS-REFERENCE TO RELATED APPLICATIONS

The present application is a continuation of U.S. application Ser. No. 16/459,601 filed Jul. 1, 2019, which is a continuation of International Application No. PCT/GB2019/050513 filed Feb. 25, 2019, which claims priority to Great Britain Patent Application No. 1804194.7 filed Mar. 15, 2018 and Great Britain Patent Application No. 1813101.1 filed Aug. 10, 2018, which are hereby incorporated by reference herein.

FIELD

The present invention relates to a method and system for automatic localisation of static objects in an urban environment. More particularly, the present invention relates to the use of noisy 2-Dimensional (2D) image data to identify and determine 3-Dimensional (3D) positions of objects in large scale urban or city environments.

BACKGROUND

Environment maps and map data is pivotal for robotics, augmented and virtual reality applications. The next generation of robots, such as self-driving cars, are likely to be reliant on data extracted from environment maps and would therefore operate more robustly by having accurately annotated or described map features.

Precision of the maps' metric and semantic components play a major role in ensuring robots operate safely and efficiently in its environments, with improved perception. Semantic components of maps typically contain static objects such as road signs, traffic lights, road markings, etc., which are currently labelled manually. Although this may be possible in suburban and rural environments, it becomes extremely time and cost intensive at a city-scale where manual labelling is practically impossible due to the ever-changing landscape.

Accurately localising and differentiating objects in maps has been problematic for many methods and systems devised to visually match similar objects together. Such systems lack capability in differentiating objects which inherently look similar (e.g., traffic lights), and the ability to comprehend factors such as lighting, time-of-day, weather conditions, etc. For this reason, machine learning techniques have become the dominant approach for detecting static 3D objects in an environment.

A basic component of vision-based systems is to establish an accurate 2D detection of a static 3D object in a single image or video. This is commonly achieved using triangulation techniques. For example, if the same object is detected from two images captured by a stereo camera, it is possible to determine the 3D position of the object by using triangulation calculations. Additionally, this method can be expanded by using multiple cameras to observe/monitor the same object. Advantageously, this can improve the triangulation calculations and the resulting estimated position.

However, a common problem underlying these triangulation approaches is the need to accurately localise a set of sensors, or cameras, in a certain area. In order to address this problem, GPS systems are often used to provide highly precise location information for the sensor(s). However, in dense urban environments, GPS systems are faced with limited levels of accuracy due to limited direct visibility of the sky.

It is therefore desired that a method and system is provided for overcoming the aforementioned problems.

SUMMARY OF INVENTION

Aspects and/or embodiments seek to provide a method, system, and vehicle for automatically locating static 3D objects in urban environments by using a voting-based triangulation technique. Aspects and/or embodiments also provide a method for updating map data after automatically new 3D static objects in an environment.

According to a first aspect, there is provided a method for automatically locating one or more static objects in an environment, the method comprising, receiving a plurality of 2D images of the environment; detecting one or more static objects from the plurality of 2D images and generating a data set of 2D static object detections; and performing a voting-based triangulation on the data set of 2D static object detections to determine 3D positions for the one or more static objects detected in the environment.

By doing so, the method automatically generates labels for entire cities without the need for manually labelling objects in map data. This enables autonomous robots and/or vehicles to operate more robustly in an environment by having access to map data with strong prior data on the environment, and by having metric and semantic components of the environment for localisation and planning. A distributed voting schema is implemented on information extracted from 2D images to accurately recover 3D positions of detected objects such as traffic lights.

Optionally, the 2D images comprise at least one of or any combination of: camera-intrinsic parameters; pose information; six degrees-of-freedom pose information for each image; or being captured using a fleet of mapping vehicles.

Having camera-intrinsic data allows 3D information of detected objects to be extracted from 2D image data. Pose data can relate to position and orientation of the device. More particularly, pose data of a sensor can relate to the pose of a sensor at the time the sensor data is captured.

In some cases, the vehicles can traverse an area of the environment multiple times in at least one of: a varying direction, a varying time of day and a varying weather conditions so as to capture the environment in all possibilities.

Optionally the step of detecting one or more static objects comprise at least one of or any combination of: considering a static object detected when the same static object is detected in at least two 2D images from the plurality of 2D images; the object is detected in the at least two 2D images with a minimum angle difference; computing a pixel probability to determine whether a pixel corresponds to a static object; a thresholding technique to determine neighbouring connecting pixels that also represent the static object; or bounding boxes used to identify static objects in each 2D image.

In this way, objects such as traffic lights are considered to be detected by the method when it is seen in two different 2D images. In order to clearly display detections in the images, the method can highlight a detection using a bound box around the object.

Optionally, the voting-based triangulation comprises using at least two detections from different 2D images that correspond to the same static object.

In order to perform triangulation techniques on detected objects, the method requires at least two detections from different images.

Optionally, the voting-based triangulation further comprises creating a hypothesis for each pair of static object detections.

Since a vast number of detections will be picked up, the method will hypothesise that a pair of detections corresponds to the same real-world object or traffic light. This voting method also jointly determines 2D associations, such as feature descriptors, and the position of objects, such as traffic lights, in 3D space.

Optionally, the or each hypothesis is scored based on a number of votes wherein each vote is indicative of the hypothesis being correct.

The voting schema confirms the likelihood of the or each hypothesis pairing being correct. The higher the number of votes, the higher the probability of the hypothesis being correct.

Optionally, a 3D position for the or each hypothesis is estimated.

Optionally, the voting comprises: using the image pose information and camera-intrinsic information, projecting each estimated 3D position of the or each hypothesis into the plurality of 2D images; and assigning a vote to the or each hypothesis when the distance between the 3D position and any 2D detection is less than a first threshold.

The projection of each hypothesis into each 2D images indicates whether or not the or each hypothesis is correct. The position of the hypothesised object can be projected into the 2D image by using the camera pose and intrinsic data.

Optionally, the or each hypothesis is confirmed to be correct by the number of received votes, so as to create a set of confirmed hypotheses.

After processing each hypothesis, the invention will create a set of confirmed hypotheses which identify all the pairings that have been correct.

Optionally, a K-view triangulation is used to determine an accurate 3D position for the or each hypothesis, where K is dependent upon the number of different images that contributed a vote to the hypothesis.

Optionally, the one or more static objects are traffic lights and/or traffic signs.

Optionally, the creation of the hypothesis comprises any one of: determining whether the projected position is less than $d_{max}$ to any 2D detection; determining whether the 3D position point is triangulated in front of each camera; determining whether the angle between each projected position is larger than $\theta_{min}$, or determining whether the distance from the static object to either camera is less than $r_{max}$.

When considering a hypothesis there can be a number of constrains applied to the system to restrict the options and thereby provide a better beginning point for the pairing of detections.

Optionally, the method for locating automatically one or more static objects in an environment is performed in clusters of the environment using a distribution schema to split the data set. Optionally, each cluster operates independently.

Increasing the area of an environment that needs to be labelled inherently increases the complexity of the method. It is therefore preferred to use a distribution schema to split the map into several clusters that can be processed independently, before being combined.

Optionally, the step of detecting one or more static objects comprises the use of a binary segmentation network and/or convolutional neural networks.

Optionally, the binary segmentation network and/or convolutional neural networks are trained using an existing data set.

Using a binary segmentation network and/or a convolution neural network improves the efficiency and performance of the overall method and system as they can perform several calculations without difficulty.

Optionally, each 2D image is processed using structure-from-motion, SFM, techniques to estimate pose information of each 2D image.

According to another aspect, there is provided a system for automatically locating one or more static objects in an environment, the system comprising; a fleet of mapping vehicles operable to capture a plurality of 2D images of the environment; a cloud based network comprising a processor operable to determine one or more static objects from the plurality of 2D images and generate a data set of 2D static object detections; wherein the processor is operable to perform a voting-based triangulation on the data set of the 2D static object detections to determine 3D positions for the one or more static objects detected in the environment.

Having a cloud based network to process the information reduces the processing power needed on the or each vehicle using the method. The system efficiently distributes the power requirements between vehicles and a server based systems to process information.

Optionally, at least one server system is operable to perform any of the features described above. Optionally, a plurality of independent clusters configured to independently process a portion of the environment.

According to yet another aspect, there is provided a vehicle for automatically locating one or more static objects in an environment, the vehicle comprising; a camera operable to capture a plurality of 2D images of the environment; a connection to a cloud based network comprising a processor operable to determine one or more static objects from the plurality of 2D images and generate a data set of 2D static object detections; wherein the processor is operable to perform a voting-based triangulation on the data set of the 2D static object detections to determine 3D positions for the one or more static objects detected in the environment.

According to another aspect, there is provided a method for updating map data when automatically locating one or more static objects in an environment, the method comprising;

receiving a plurality of 2D images of the environment; determining one or more static objects from the plurality of 2D images and generating a data set of 2D static object detections; performing a voting-based triangulation on the data set of the 2D static object detections to determine 3D positions for the one or more static objects detected in the environment; and updating existing map data with one or more newly located static objects.

According to another aspect, there is provided a computer program product for providing the method or system of any preceding claim.

The server system can be a centralised sever or a collation of cloud and mobile devices.

BRIEF DESCRIPTION OF DRAWINGS

Embodiments will now be described, by way of example only and with reference to the accompanying drawings having like-reference numerals, in which:

FIG. 2 depicts the logic flow of the robust voting-based triangulation according to an embodiment.

DETAILED DESCRIPTION

Figure 1:
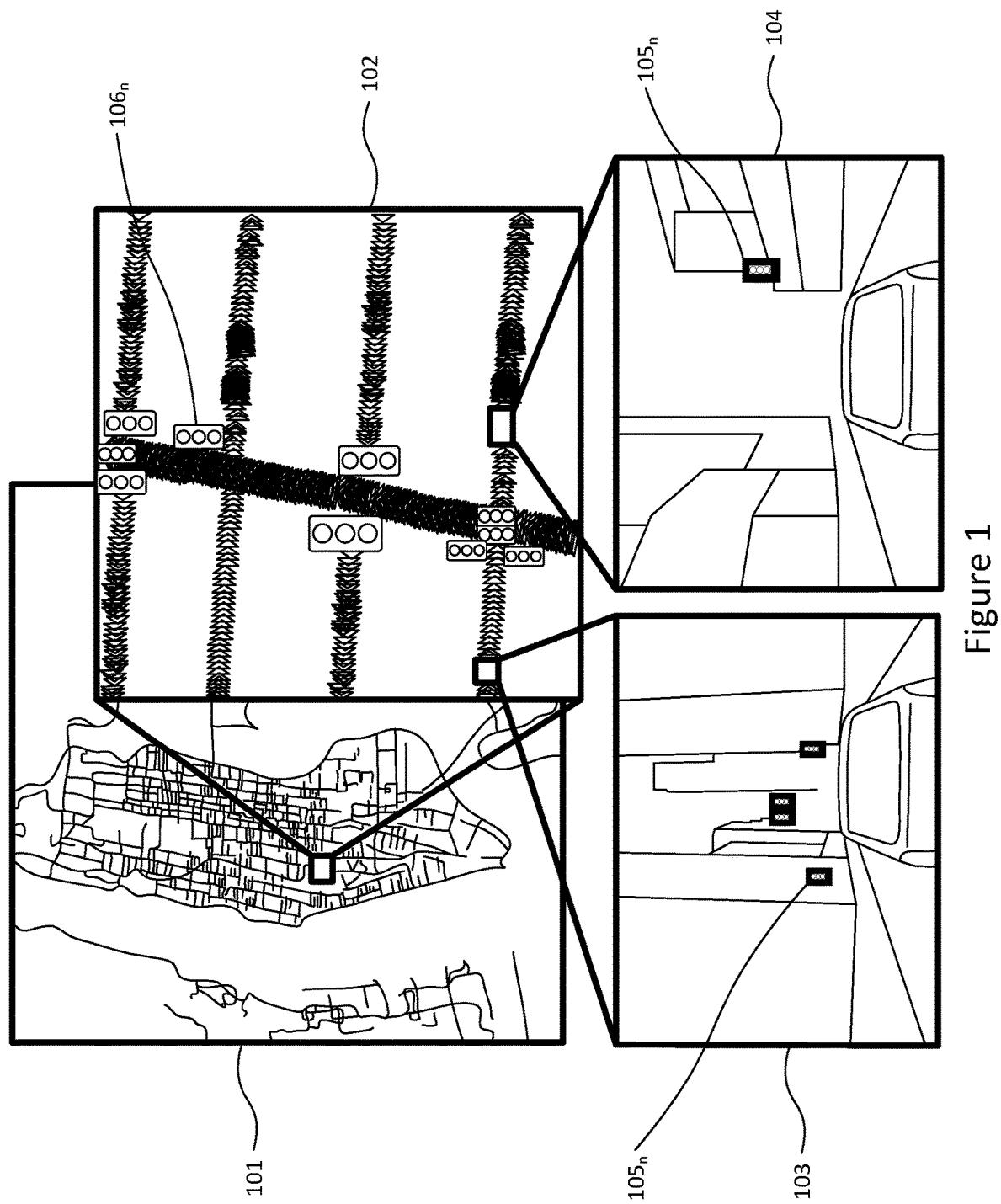
FIG. 1 illustrates a semantic map on which traffic lights are detected and labelled according to an embodiment.

An example embodiment will now be described with reference to FIGS. 1 and 2.

In this embodiment, the system starts by receiving a large set of 2D images $I_i$, with associated camera-intrinsic parameters $q_i$ and 6 degrees-of-freedom poses $P_i \in \mathbb{S}\,\mathbb{E}(3)$, and produces a set of 3D positions of objects $L_i \in \mathbb{R}^3$ detected from the set of 2D images.

As illustrated in FIG. 1, the initial set of 2D images are captured from a mapping fleet traversing various cities/urban environments. Section 101 of FIG. 1 shows an example of such environments. The mapping fleet usually comprises vehicles that traverse roads and paths multiple times, in both directions, at varying times of day and during different weather conditions. During this time, the vehicles of the mapping fleet capture images, 103, 104, at regular intervals. The trajectories of the traversing vehicles are also illustrated in FIG. 1 by 102. The data captured by the fleet of mapping vehicles may also be used to generate a map, 101, of the environment by implementing techniques such as SLAM.

Whilst capturing these images, the system records camera-intrinsic parameters such as the optical centre (principal point), focal length, image distortion, etc. Additionally, the poses can be calculated using a large-scale structure-from-motion (SFM) pipeline. State-of-the-art SFM systems construct large-scale maps of an environment and, in this embodiment, it is used to accurately localise the positions of all the sensors (e.g., cameras). Although it is preferred that the poses are calculated using SFM, there is no restriction on the method of calculation or source of the poses as long as they are accurate and globally consistent.

To calculate the 3D positions P of each image, each captured image is resized to 640×480 and then fed through a large-scale, distributed, structure-from-motion pipeline which may be running on multiple computers.

In order to detect objects in the data set of 2D images, a noisy 2D detector is applied to each image $I_L$ resulting in a set of object detections $Z_i \subset \mathbb{R}^2$. In the case of traffic lights, an off-the-shelf CNN trained to predict bounding boxes for traffic lights can be used to generate the 2D object detections in the images. Similarly, when detecting other objects in an environment, CNNs pre-trained to predict bounding boxes that for that particular object may be used in this system. Examples of the bounding boxes $105n$ for traffic lights are illustrated in FIG. 1 within the captured images, 103, 104. The detections illustrated in FIG. 1 correspond to true positive detections of traffic lights from obtained/received images.

The detected traffic lights can be shown on the trajectory or map data as indicated by $106n$ in section 102.

In the CNN architecture used to detect traffic lights, firstly, a binary segmentation network is used to compute the probability of each pixel in a picture depicting a part of a traffic light. Once a probability for each pixel is computed, a thresholding schema is then applied to determine the connected components of pixels representing traffic lights. Finally, to visually aid the detection, a bounding box is fitted around a group of pixels that are detected to be portraying a traffic light.

The output detections of this system are usually noisy and suffer from many false positives and false negatives. As discussed later, the system compensates for these noisy detections by using a large amount of data. One alternative to using a detector as described above is to use hand-annotated labels from internet based crowdsourcing platforms such as "Amazon Mechanical Turk" that enable individuals and businesses to coordinate the use of human intelligence to perform tasks that computers currently struggle to complete. However, this alternate also suffers from label noise. In this way, each image will have associated ground-truth 2D labels of traffic lights with label noise estimated at approximately 5%.

In doing so, many physical 3D objects are detected from the initial dataset of 2D images. Each 2D data set covers an area or an urban environment with a certain number of physical objects, for example, traffic lights. In this embodiment, a traffic light is considered recoverable if it has been observed from at least two different viewpoints under an angle difference of at least $\theta_{min}$. However, as the amount of data increases, almost all the traffic lights in any given area eventually become recoverable. In some traditional scenarios, where the 3D position of a traffic light cannot be accurately determined, some traffic lights are not recoverable.

Bearing in mind that each physical 3D object can be captured by a plurality of images taken in varying angles, many of these detections may in fact relate to the same physical object. Using the set of 2D detections alone, it is not possible to identify which detections are to be associated with which physical object and thus identify multiple detections of the same physical object. Any feature descriptors that might associate/differentiate the detections would be useless under the appearance changes that are seen in outdoor environments and this is particularly the case of objects that look similar. Traffic lights are a good example of physical 3D objects that are difficult to associate/differentiate. Many existing approaches rely on a need to visually match objects between images.

Without relying on the appearance, the only differentiating factor between each physical 3D object is their position in 3D space. Current methods of multi-view triangulation cannot be used without positions of the objects in 3D space. Instead of using traditional methods of triangulation, this system uses a robust voting-based triangulation method, as shown in FIG. 2, to simultaneously determine 2D associations of physical objects and the position of the traffic lights/physical objects in 3D space. The flow shown in FIG. 2 lists various input and output variables. For example, inputs may include but are not limited to, a set of images, camera intrinsics, camera poses, maximum reprojection error, minimum ratio of inliers and the output comprises 3D positions for each physical 3D objects.

For each pair of detections $(z_a, z_b)$, where a and b are indices into 2D detections, from two different images $(I_i, I_j)$, a 3D hypothesis $h_{ab}$ is created under the assumption that these two detections correspond to the same physical 3D object/traffic light. The pairing of 2D detections results in a total $\mathcal{O}(N^2)$ hypotheses where N is the total number of detected traffic lights.

In some cases, a hypothesis can be constrained to or is considered viable if it satisfies the following:

1) triangulation constraint: the point is triangulated in front of each camera, 2) rays intersect in 3D space: the reprojection error is smaller than $d_{max}$, 3) the projection is stable: the angle between the optical axes is larger than $\theta_{min}$, 4) distance to camera: the distance from the traffic light to either camera is less than $r_{max}$.

Optionally, additional constraints reflecting prior information about the location of a traffic lights can be used to further restrict the hypothesis space.

Once a set of hypotheses have been created, the system estimates the 3D position of each hypothesis. This can be achieved using traditional methods of triangulation using the pair of detections, $z_a$, $z_b$ as shown in FIG. 2:

$$l_{ab} \leftarrow \text{trianulate}(\{z_a, z_b\})$$

One such method of estimating the 3D position l* of each hypothesis is K-view triangulation where K is indicative of the number of detections for each physical object. In the example of the pair of detections ($z_a$, $z_b$), K=2. By using K-view triangulation, the sum of the reprojection errors is minimised:

$$l^* = \underset{l}{\operatorname{argmin}} \sum_{k \in K} (\pi(l, p_k, q_k) - z_k)^2,$$

where:
K is {a, b} in this case, $\pi$ is the projection of the 3D hypothesis l into the camera at position $p_k$ with camera intrinsics $q_k$.

For each estimated 3D position, a set of consistent inliers $S_{ab}$ is computed. This set of inliers consists of all the 2D detections that correctly observe an object/traffic light at the same location. The set of inliers is computed by projecting the 3D position l* into each image and verifying whether the projected position is less than $d_{max}$ to any 2D detection. In this way the system determines whether the estimated 3D position of a hypothesis is close enough to a 2D detection in an image to be considered a correct and true hypothesis, and gives the hypothesis a vote.

In doing so repeatedly for each hypothesis, the hypothesis with the maximum number of votes and the detections that voted for it (inlier detections) are removed as they have already been identified as correct. This process is repeated until no hypothesis with at least $\alpha \cdot M$ inliers is found, where M is the average number of inliers per hypothesis and a is a tuneable parameter over the confidence. This process then creates a set of confirmed hypotheses.

In the case of a noisy but unbiased 2D detector and a uniform distribution of the data, the system converges to the correct solution as the amount of data increases. For example, this can improve false negative and/or false positive detections. This is due to noisy detections forming hypotheses with small numbers of votes, and correct detections gathering consistent votes over time. As the amount of data increases, these two metrics begin to separate, and a is the threshold on their ratio. Notably, the number of received votes is relative to the amount of initial data (2D images) received by the system.

Finally, for every hypothesis its 3D position is refined by optimising the reprojection error over all the hypothesis detections. This entire flow of the system is presented in FIG. 2.

The above method works well for small-scale scenarios but does not scale well to large, city-scale settings due to its potential $\mathcal{O}(N^4)$ complexity where N is the number of detected traffic lights. A slightly better complexity of $\mathcal{O}(N^3)$ can be achieved by reusing the computation of the inliers after each iteration. However, to reduce the complexity of the method, a distribution schema based on splitting the data set to clusters is preferred. In this way, the above method can be used to process each cluster independently and then merge the results of the clusters at the end.

A simple clustering schema can be implemented whereby system identifies the closest images to a detected traffic light until a cluster of size Nmax is created, at which point we remove it from the data set and continue the process until it terminates.

After traffic lights from each cluster are triangulated using the method above, it might be the case that the same traffic light is triangulated in two different clusters. To resolve this issue, all pairs of traffic lights closer than 1 metre are merged, producing the final set of labels L.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A computer-implemented method comprising:
   determining, by a computing system, a data set including images associated with an object captured in an area;
   distributing, by the computing system, the data set into at least a first cluster that is associated with the object and a second cluster that is associated with the object, wherein the first and second clusters are based on an identification of the images included in the data set; and
   determining, by the computing system, a position of the object based on triangulating the object according to at least the first cluster and the second cluster, wherein the determining the position of the object comprises:
     performing, by the computing system, voting-based triangulation on the first cluster, wherein a vote is based on a distance between an estimated position and a position of a detection of the object in an image; and
     performing, by the computing system, the voting-based triangulation on the second cluster.

2. The method of claim 1, wherein the triangulating the object is based on a hypothesis and the hypothesis is determined based on at least one of: a point triangulated in front of one or more cameras associated with the images in the first cluster or the second cluster, a reprojection error of intersected rays associated with the images in the first cluster or the second cluster, an angle between optical axes associated with the images in the first cluster or the second cluster, or a distance from the object to the one or more cameras associated with the images in the first cluster or the second cluster.

3. The method of claim 2, further comprising:
   determining, by the computing system, inliers in the first cluster or the second cluster that observe the object within a threshold distance of a position associated with the hypothesis, wherein the hypothesis is confirmed based on a threshold number of the inliers.

4. The method of claim 3, further comprising:
removing, by the computing system, the inliers that observe the object from the data set based on a confirmation of the hypothesis; and
distributing, by the computing system, the data set into new clusters associated with another object captured in the area.

5. The method of claim 4, wherein the distributing the data set into the new clusters is based on a determination that at least one hypothesis with a threshold number of inliers remains, wherein the threshold number of inliers is based on an average number of inliers per hypothesis and a confidence parameter.

6. The method of claim 4, further comprising:
reusing, by the computing system, computations of inliers that are not associated with a confirmed hypothesis to confirm a hypothesis associated with a third cluster of the new clusters.

7. The method of claim 1, further comprising:
determining, by the computing system, another position of another object in the area based on at least a third cluster; and
merging, by the computing system, the object and the another object based on a determination that the position of the object and the another position of the another object are within a threshold distance.

8. The method of claim 1, wherein the first cluster and the second cluster are independently processed and results of the independently processed first cluster and the independently processed second cluster are merged.

9. The method of claim 8, wherein the object is detected based on a convolutional neural network trained to predict bounding boxes fitted around pixels representing objects using an application of a thresholding schema to determine connected components of the pixels representing the objects in the images.

10. The method of claim 1, wherein the distributing the data set comprises:
distributing the images in the data set captured within a first threshold distance of the object into the first cluster until the first cluster reaches a first threshold size;
removing the images distributed into the first cluster from the data set; and
distributing the images in the data set captured within a second threshold distance of the object into the second cluster until the second cluster reaches a second threshold size.

11. A system comprising:
at least one processor; and
a memory storing instructions that, when executed by the at least one processor, cause the system to perform:
determining a data set including images associated with an object captured in an area;
distributing the data set into at least a first cluster that is associated with the object and a second cluster that is associated with the object, wherein the first and second clusters are based on an identification of the images included in the data set; and
determining a position of the object based on triangulating the object according to at least the first cluster and the second cluster, wherein the determining the position of the object comprises:
performing voting-based triangulation on the first cluster, wherein a vote is based on a distance between an estimated position and a position of a detection of the object in an image; and
performing the voting-based triangulation on the second cluster.

12. The system of claim 11, wherein the triangulating the object is based on a hypothesis and the hypothesis is determined based on at least one of: a point triangulated in front of one or more cameras associated with the images in the first cluster or the second cluster, a reprojection error of intersected rays associated with the images in the first cluster or the second cluster, an angle between optical axes associated with the images in the first cluster or the second cluster, or a distance from the object to the camera associated with the images in the first cluster or the second cluster.

13. The system of claim 12, wherein the at least one processor further causes the system to perform:
determining inliers in the first cluster or the second cluster that observe the object within a threshold distance of a position associated with the hypothesis, wherein the hypothesis is confirmed based on a threshold number of the inliers.

14. The system of claim 13, wherein the at least one processor further causes the system to perform:
removing the inliers that observe the object from the data set based on a confirmation of the hypothesis; and
distributing the data set into new clusters associated with another object captured in the area.

15. The system of claim 14, wherein the distributing the data set into the new clusters is based on a determination that at least one hypothesis with a threshold number of inliers remains, wherein the threshold number of inliers is based on an average number of inliers per hypothesis and a confidence parameter.

16. A non-transitory computer-readable storage medium including instructions that, when executed by at least on processor of a computing system, cause the computing system to perform:
determining a data set including images associated with an object captured in an area;
distributing the data set into at least a first cluster that is associated with the object and a second cluster that is associated with the object, wherein the first and second clusters are based on an identification of the images included in the data set; and
determining a position of the object based on triangulating the object according to at least the first cluster and the second cluster, wherein the determining the position of the object comprises:
performing voting-based triangulation on the first cluster, wherein a vote is based on a distance between an estimated position and a position of a detection of the object in an image; and
performing the voting-based triangulation on the second cluster.

17. The non-transitory computer-readable storage medium of claim 16, wherein the triangulating the object is based on a hypothesis and the hypothesis is determined based on at least one of: a point triangulated in front of one or more cameras associated with the images in the first cluster or the second cluster, a reprojection error of intersected rays associated with the images in the first cluster or the second cluster, an angle between optical axes associated with the images in the first cluster or the second cluster, or a distance from the object to the camera associated with the images in the first cluster or the second cluster.

18. The non-transitory computer-readable storage medium of claim 17, wherein the at least one processor further causes the computing system to perform:

determining inliers in the first cluster or the second cluster that observe the object within a threshold distance of a position associated with the hypothesis, wherein the hypothesis is confirmed based on a threshold number of the inliers.

19. The non-transitory computer-readable storage medium of claim 18, wherein the at least one processor further causes the computing system to perform:
removing the inliers that observe the object from the data set based on a confirmation of the hypothesis; and
distributing the data set into new clusters associated with another object captured in the area.

20. The non-transitory computer-readable storage medium of claim 19, wherein the distributing the data set into the new clusters is based on a determination that at least one hypothesis with a threshold number of inliers remains, wherein the threshold number of inliers is based on an average number of inliers per hypothesis and a confidence parameter.

* * * * *